US008452851B2

(12) United States Patent
Kabiljo et al.

(10) Patent No.: US 8,452,851 B2
(45) Date of Patent: May 28, 2013

(54) SYSTEM AND METHOD FOR GROUPING OF USERS INTO OVERLAPPING CLUSTERS IN SOCIAL NETWORKS

(75) Inventors: Igor Kabiljo, Belgrade (RS); Borislav Agapiev, Portland, OR (US); Aleksandar Ilic, Nis (RS)

(73) Assignee: Jildy, Inc., Palo Alto, CA (US)

( * ) Notice: Subject to any disclaimer, the term of this patent is extended or adjusted under 35 U.S.C. 154(b) by 0 days.

(21) Appl. No.: 13/269,502

(22) Filed: Oct. 7, 2011

(65) Prior Publication Data
US 2013/0013601 A1 Jan. 10, 2013

Related U.S. Application Data

(60) Provisional application No. 61/505,995, filed on Jul. 8, 2011.

(51) Int. Cl.
*G06F 15/16* (2006.01)

(52) U.S. Cl.
USPC .................. 709/218; 705/1; 705/1.1; 707/737

(58) Field of Classification Search
USPC .......................... 709/218; 705/1, 1.1; 707/737
See application file for complete search history.

(56) References Cited

U.S. PATENT DOCUMENTS

| 6,735,568 | B1 | 5/2004 | Buckwalter et al. | |
|---|---|---|---|---|
| 6,996,572 | B1 | 2/2006 | Chakrabarti et al. | |
| 7,024,404 | B1 | 4/2006 | Gerasoulis et al. | |
| 7,085,772 | B1 | 8/2006 | Sternemann | |
| 7,240,055 | B2 | 7/2007 | Grasso et al. | |
| 7,330,849 | B2 | 2/2008 | Gerasoulis | |
| 7,512,587 | B2 | 3/2009 | McSherry | |
| 8,005,909 | B2 | 8/2011 | Raman | |
| 2004/0230409 | A1 | 11/2004 | Saias | |
| 2004/0267686 | A1 | 12/2004 | Chayes | |
| 2005/0060287 | A1 | 3/2005 | Hellman et al. | |
| 2009/0024549 | A1 | 1/2009 | Johnson | |
| 2009/0216799 | A1* | 8/2009 | Manjrekar et al. | 707/103 Y |
| 2009/0228296 | A1 | 9/2009 | Ismalon | |
| 2009/0319288 | A1* | 12/2009 | Slaney et al. | 705/1 |
| 2010/0145771 | A1 | 6/2010 | Fligler et al. | |
| 2010/0332270 | A1 | 12/2010 | Richter et al. | |
| 2011/0055379 | A1 | 3/2011 | Lin et al. | |
| 2011/0265011 | A1* | 10/2011 | Taylor et al. | 715/751 |

FOREIGN PATENT DOCUMENTS

WO 2010068840 A1 6/2010

OTHER PUBLICATIONS

Marianna, Bolla, "Noisy random graphs and their Laplacians", Discrete Mathematics, vol. 308, No. 18, pp. 4221-4230 (2007).
Bo, Yang et al., "Community Mining from Signed Social Networks", IEEE Transactions on Knowledge and Data Engineering, vol. 19, Issue:10, pp. 1333-1348 (Oct. 2007).
Bo, Yang et al., "On the Spectral Characterization and Scalable Mining of Network Communities", IEEE Transactions on Knowledge and Data Engineering, vol. PP, Issue:99, pp. 1-19 (2008).
Hossmann, T. et al., Know Thy Neighbor: Towards Optimal Mapping of Contacts to Social Graphs for DTN Routing, 2010 Proceedings IEEE INFOCOM, Mar. 14-19, 2010, pp. 1-9 (2010).
Obadi, G. et al., "Finding Patterns of Students' Behavior in Synthetic Social Networks", 2010 International Conference on Advances in Social Networks Analysis and Mining (ASONAM), Aug. 9-11, 2010, pp. 411-413 (Sep. 7, 2010).
Wang, Xiang et al., "Discovering Contexts and Contextual Outliers Using Random Walks in Graphs", Ninth IEEE International Conference on Data Mining, ICDM '09, Dec. 6-9, 2009, pp. 1034-1039 (2009).
Baras, J.S. et al., "Dynamic self-organization and clustering in distributed networked systems for performance improvement", 47th Annual Allerton Conference on Communication, Control, and Computing, Sep. 30-Oct. 2, 2009, pp. 968-975 (2009).
Cornelias, F. et al., "A Star Based Model for the Eigenvalue Power Law of Internet Graphs", Preprint submitted to Elsivier Science, pp. 1-7 (Dec. 2004).
Ilyas, M.U. et al., "A distributed and privacy preserving algorithm for identifying information hubs in social networks", Proceedings IEEE INFOCOM, 2011, Apr. 10-15, 2011, pp. 561-565 (2011).
Seary, Andrew J. et al., "Partitioning Networks by Eigenvectors", INSNA Sunbelt XVI, London, Jul. 1995. (also published in Proceedings of the International Conference on Social Networks, vol. 1: Methodology, 47-58) (1995).
Montfort, Nick, "Discovering Communities through Information Structure and Dynamics: A Review of Recent Research", Technical Report MS-CIS-04-18, Department of Computer and Information Science University of Pennsylvania, pp. 1-28 (Aug. 9, 2004).
Kleinberg, Jon M., "Authoritative sources in a hyperlinked environment", Journal of the ACM, vol. 46 Issue 5, Sep. 1999.

\* cited by examiner

*Primary Examiner* — Kyung H Shin
(74) *Attorney, Agent, or Firm* — Tarek N. Fahmi, APC

(57) ABSTRACT

Members of a social network user's social graph are automatically segregated into overlapping clusters according to patterns of their past communications. Each cluster within the social graph represents a group of members having a high degree of intra-cluster communication or other connection with one another. The clustering is performed according to a sorting or ranking in accordance with non-principal eigenvectors of connectivity matrices describing the intra-cluster communications/connections. The overlapping clusters exhibit maximum internal density and minimum external sparsity.

2 Claims, No Drawings

SYSTEM AND METHOD FOR GROUPING OF USERS INTO OVERLAPPING CLUSTERS IN SOCIAL NETWORKS

RELATED APPLICATIONS

This application is a NONPROVISIONAL of, claims priority to and incorporates by reference U.S. Provisional Application No. 61/505,995, filed 8 Jul. 2011. U.S. patent application Ser. No. 13/099,051, filed May 2, 2011, which claims priority to U.S. Provisional Patent Application 61/330,550, filed May 3, 2010, and is assigned to the assignee of the present invention is also incorporated herein by reference in its entirety.

FIELD OF THE INVENTION

The present invention relates to systems and methods for grouping of users into overlapping clusters in social networks, where users may belong to more than one cluster or no cluster at all.

BACKGROUND

Internet-based social networks (e.g., websites or portals where large numbers of users interact with each other and maintain online connections and relationships with their friends) have emerged as one of the central and most important means of social communication and interaction on the contemporary Internet. It is not surprising, therefore, that these social networks are also of intense interest to advertisers and others. Among the features of Internet-based social network systems that make them so desirable to advertisers and the like is the fact that users of these systems tend to maintain lists of connections to friends, acquaintances and others. Examples of social networks that employ such mechanisms are Twitter™, Facebook™, Google Plus™ and LinkedIn™.

Often, in order for an online connection to be created between two such users, a "target friend" of a user has to confirm his/her agreement to create the connection, making the connection that much more reliable from the point of view of the advertisers, etc. In some instances, upon creation of such connections the connected individuals automatically begin receiving information regarding one another's activities (e.g., a "personal news feed"). Information included in such personal news feeds may include expressions of preferences for a particular object (e.g., video, picture, piece of music, comment, post, link, etc.), so indicated by a user "liking" the object, updates regarding the posting of an article or comments on another user's actions, etc. In order to maintain control and protect users' privacy, social networks impose privacy constraints on what kind of material each user may access. A typical constraint is to allow users to access only updates from their friends and, perhaps, friends-of-friends and not beyond (unless, say, the subject material is publicly accessible).

Each user in a social network typically has many friends, sometimes hundreds. These friends represent connections from a multitude of facets of a subject user's life, including, but not limited to, the user's family, workplace colleagues, friends from school(s), fellow hobbyists, association members, etc. The range of actions and activities in each group is typically of interest only to the members of the subject group and not to all of the user's other "friends". Displaying all the updates to all of the user's friends is therefore often excessive and imposes a burden on friends having little or no interest in the subject matter of the updates. Such unfettered sharing of information may also lead to breaches of privacy (both real and perceived), since often certain updates or portions thereof should be constrained to members of a target audience.

One solution to this problem is to divide all friends of a user into groups, where members within each group are associated and related to each other through one of the above-mentioned facets of the subject user's life. Contemporary Internet-based social networks sometimes provide means for users to create such groups manually (e.g., by separately classifying each friend or contact in some fashion), however, these manual processes tend to be very tedious and many users are unwilling to invest the time and effort necessary to create and maintain such groupings. Recently, Google Plus, a social network developed by Google Inc. of Mountain View, Calif., has offered pre-defined groupings such as "family", "friends" and "acquaintnces".

SUMMARY OF THE INVENTION

In one embodiment, the present invention provides for automatically clustering members of a social network user's social graph using patterns of past communications among the member of the social graph as a basis for such clustering. Each cluster within the social graph represents a group of members having a high degree of intra-cluster communication or other connection with one another. The clustering is performed according to a sorting or ranking in accordance with non-principal eigenvectors of connectivity matrices describing the intra-cluster communications/connections. The overlapping clusters exhibit maximum internal density and minimum external sparsity

DETAILED DESCRIPTION

Described herein are methods for automatically grouping users into overlapping clusters in social networks, where users may belong to more than one cluster or no cluster at all. More specifically, the present invention provides for automatically clustering members of a social network user's social graph, the set of user-defined relationships within the social networking system, using patterns of past communications with that social graph as a basis for said clustering. Each cluster represents a group of users who have a high degree of activity in communicating to other members of the cluster and/or are mostly in a relationship (friendship or otherwise) with each other.

Social networks of the aforementioned variety can be and often are described as graphs. Users are nodes or vertices in such a graph and connections between users can be described as edges between the nodes. In accordance with embodiments of the present invention, eigenvalue analyses of connectivity matrices are used to successively partition graphs of social connections of a user of a social network and to create a partitioning that is as close to optimal as possible, according to a defined objective optimization function. While a user is capable of developing such groupings on his or her own (at least according to group criteria and manual grouping tools offered by the operators of various social networks), the process is time consuming and subject to human error and subjective interpretations. A preferable solution to the grouping problem, as provided by the present invention, is to solve it automatically with little or no user intervention. In the present case, users of a social network are automatically partitioned into overlapping clusters, where for each cluster all members of the cluster are strongly connected to the other members of the cluster based on, but not limited to, a pattern of past communication between one another.

Below, we describe how to use eigenvectors and eigenvalues of social matrices describing user connections and activities in social networks to produce the overlapping clusters we seek. The clusters represent groups of users related to each to each other based on, for example, a pattern of communication among members of the cluster. Information related to the communications among members of the social network may be obtained from said network, for example by extracting postings to users' social network sites, reviewing tweets or similar communications exchanged among members of the social networks, examining "friend lists" of users of the social network, etc. We seek overlapping clusters because this allows for members to belong to more than one cluster, which more accurately reflects real life situations and scenarios where users might be involved in more than one type of activity or group. It has been reported that in contemporary social networks an average user belongs to between 3 and 6 groups. We show how to use eigenvectors and eigenvalues that are not principal to produce such clustering.

As mentioned above, a social network can be described as a graph where users are represented as nodes or vertices and connections between users are represented as edges. In mathematical terms, given a set of vertices $V=\{v_1, v_2, \ldots v_n\}$ representing members of a social network, and a set of undirected edges $E=\{(u,v)|u,v \in V\}$ between them, we want to find a set of clusters $S=\{C_1, C_2, \ldots, C_k\}$, where each $C_i$ is a subset of V that will maximize a quality function, quality(S).

In order to have good clustering (e.g., clustering that accurately represents real-world relationships between members of the clusters), the choice of the quality function is very important. That is, a clustering solution that maximizes quality(S) should actually be the best one, or at least a very good one. This provides us a set of boundaries on possible quality functions and we define a set of rules quality functions must satisfy in order to be considered good quality functions:

A. If the graph is empty, $S_{best}$ is empty ($S_{best}$ is clustering that maximizes the quality function).

B. If the graph is complete, $S_{best}$ contains a single cluster—the entire graph.

C. If the graph consists of two overlapping cliques, then $S_{best}$ should be either the single cluster representing whole graph, or two clusters each representing one of the cliques.

D. If a vertex, v, is connected to all other vertices, each cluster in Sbest must contain vertex v.

E. Each cluster in $S_{best}$ must be biconnected.

F. If we have two nonoverlapping graphs, best clustering in their union must be the union of best clustering in each of them.

To define quality function quality(S) we introduce two measures—internal density and external sparsity. It is important to note that other types, different from the ones described below, of internal density and external sparsity may be used. Indeed, the present methods can work without explicit definitions of such measures. Thus, the examples of internal density and external sparsity functions we introduce should not be read as limiting the present invention.

Internal density of a cluster is defined as the ratio between the number of edges in the subgraph induced by the cluster and the number of edges in a clique of the same size (number of vertices) as the cluster. A clique is a graph in which there is an edge between any two vertices. We introduce $\alpha$, the internal density coefficient, defined as:

$$\alpha(C) = \frac{2|E[C]|}{|C|(|C|-1)},$$

where E[C] means an induced subgraph.

For considerations of external sparsity, first let us denote a maximal number of inbound edges with:

$$b(C) = \max_{v \in V \setminus C} |\{u | u \in C, (u,v) \in E\}|.$$

Now we can denote external sparsity with $\beta$, and calculate it as maximal ratio of inbound edges for any outer vertex, or:

$$\beta(C) = \frac{b(C)}{|C|} = \max_{v \in V \setminus C} \left( \frac{|\{u \mid u \in C, (u,v) \in E\}|}{|C|} \right).$$

Note that both $\alpha$ and $\beta$ are always in interval [0,1].

Internal density and external sparsity coefficients can properly describe features of a single cluster. We want internal density to be as large as possible and external sparsity to be as small as possible. Even though they essentially explain the same feature of a graph—how many edges are present for some subset of possible edges—they calculate the result in intrinsically different ways. Internal density is an average over all edges, where each single edge has an equal small influence in the result, whereas external sparsity takes only extreme cases into account.

When using averages, only the total number of edges is important, not how are they placed. When using an extreme case the opposite is true, the total number of edges is irrelevant but how the edges are distributed over the vertices is important. The use of these two different approaches for calculating internal density and external sparsity is an important feature. If we try to use an average of edges for external sparsity, then the size of an independent component in a graph can influence the quality of the clique, which should be a local property, uncorrelated with independent parts of the graph. Also, it would mean that for large graphs, it is not important if a cluster is missing a few vertices, because they are averaged over the whole graph. On the other hand, if we used the extreme case for both coefficients, in other words the least connected vertex in a cluster for internal density, we could create cases where no cluster is good enough, even though it should be. One thing that can be done is that both internal density and external sparsity can be computed with a procedure that lies between these two extremes. For example, a process that takes into account a weighted sum of sorted signals. That would make extreme vertices most important, but all vertices would have at least some importance.

Next we put together a computation for a set of clusters. In partitioning a user's social graph, we observe some intuitive rules for best clustering. For example, we want to keep as many good clusters as possible but we do not want almost identical clusters that differ only on one or a few vertices (as this would lead to too many clusters to be truly useable for the average user). Also we do not want some clusters to be complete subsets of other clusters, though this requirement is optional and can be relaxed.

We will therefore define a similarity index as:

$$similarityIndex(C_i) = \sum_{j \neq i} \left( \frac{|C_i \cap C_j|}{|C_i|} \right)^2.$$

The lower the similarityIndex is, the better it is (i.e., the better the clustering so represented), since this indicates an individual cluster is more different from the other clusters.

Finally, we do not want $\alpha$ and $\beta$ to be too close and we do not want the clusters to be very small (again leading to a situation where there are too many clusters to be useable in a real world sense), so we add an artificial penalty based on the size of a cluster:

$$sizePenalty(C) = \frac{2}{|C|}.$$

Thus quality(S) becomes:

$$quality(S) = \sum_{C \in S} \alpha(C) * (1 - similarityIndex(C)) - \beta(C) - sizePenalty(C);$$

and the quality of any individual cluster is given by:

quality(C)=α(C)-β(C)-sizePenalty(C).

Having determined how to measure the quality of a clustering operation, we now turn to the issue of producing the clusters themselves. Above, we indicated that we would use eigenvectors and eigenvalues of social matrices describing user connections and activities in social networks to produce overlapping clusters of nodes representing groups of users related to each to each other. Overlapping clusters allow for members to belong to more than one cluster, which more accurately reflects real life situations and scenarios where users might be involved in more than one type of activity or group. In particular, we will use eigenvectors and eigenvalues other than principal eigenvectors and eigenvalues to produce such clustering.

Embodiments of the present invention use a spectral clustering procedure for grouping users into overlapping clusters. We represent a social network with a graph G, where users of the social network are represented by the set of vertices V of the graph and connections between them are represented by the set of edges E of the graph.

Based on the graph, we create an adjacency matrix A, where:

$$a_{i,j} = \begin{cases} 1, & (v_i, v_j) \in E \\ 0, & (v_i, v_j) \notin E \end{cases}$$

and we can also create Laplacian matrix L, defined by:

$$l_{i,j} = \begin{cases} a_{i,j}, & i \neq j \\ \sum_k a_{i,k}, & i = j \end{cases}$$

For both matrixes, we then calculate their eigenvalues and their respective eigenvectors.

The eigenvectors (or characteristic vectors) of a square matrix (i.e., one with the same number of rows and columns) are the non-zero vectors that, after being multiplied by the matrix, either remain proportional to the original vector (i.e., change only in magnitude, not in direction) or become zero. For each eigenvector, the corresponding eigenvalue (or characteristic value) is the factor by which the eigenvector changes when multiplied by the matrix. The eigenvector corresponding to the largest eigenvalue is known as the principal eigenvector. However, the principal eigenvector is only one possible eigenvector and there are many others, each with corresponding eigenvalues. The present invention makes use of eigenvectors other than the principal eigenvectors of the adjacency and Laplacian matrices. In particular, the present invention uses the largest eigenvectors of the adjacency matrix (other than its principal eigenvector) and the smallest eigenvectors (other than the principal eigenvector) of the Laplacian. For the adjacency matrix, eigenvectors at positions 2, 3, . . . , may be used, and for the Laplacian, those at positions n-1, n-2, . . . , may be used. In one embodiment of the invention, the second eigenvector of both the adjacency matrix and the Laplacian are used. The verticies in a social graph of interest may thus be sorted by their corresponding value in the selected eigenvector and ordered accordingly The initial problem of social graph clustering has thus becomes a problem of clustering points in R dimensions. Coordinates of each point represent values in the first R interesting eigenvectors (i.e., in one embodiment of the invention, the $2^{nd}$ eigenvalue for the adjacency matrix, and the $(n-1)^{th}$ eigenvalue for the Laplacian). For example, in a specific 1-dimensional space, by taking only the most interesting eigenvector we can sort all vertices by their corresponding values in that eigenvector and look for a solution only in consecutive partitions.

One aspect of ordering by eigenvectors which will be of great help here is that the process naturally separates one cluster at a time. Thus, we can expect that one of two partitions we want to create is the resulting cluster itself. And we know a good quality function for the clusters. For one part we want it to be good cluster C, but what do we require for the remaining R?

If we divide our graph into two disjunctive parts, C and R=V\C, we would miss clusters that overlap both C and V\C. So, we want vertices that have many edges to be added to R. In other words, we want R to have external sparsity as low as possible. Internal density is a plus, but is less important. Also we do not want too much overlap between C and R so that recursion does not go too wide. In total, we are looking for something just like our quality function.

The solution to any clustering problem involves a recursive step. Here, the recursive step in the problem becomes finding partitions that have the largest possible quality. We will again trust in sorting by eigenvectors and only check consecutive parts, partitioned by two indexes $s_1$ and $s_2$, having the same partitions as in the previous overlapping algorithm. For each pair of indexes, we will check its quality and take the one with the largest value.

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language including, without limitation, a object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Computer systems upon or with which the methods of the present invention may be practiced will typically include a bus or other communication mechanism for communicating information, and a processor coupled with the bus for processing information. These computer systems will also includes a main memory, such as a RAM or other dynamic storage device, coupled to the bus for storing information and instructions to be executed by the processor. Main memory also may be used for storing temporary variables or other intermediate information during execution of instructions to be executed by the processor. The computer system will further include a ROM or other static storage device coupled to the bus for storing static information and instructions for the processor. A storage device, such as a hard disk, is also typically provided and coupled to the bus for storing information and instructions.

The subject computer system may include a display coupled to the bus for displaying information to a computer user. An input device, including alphanumeric and other keys, is also often coupled to the bus for communicating information and command selections to the processor. Other types of user input devices, such as cursor control devices such as a mouse, a trackball, or cursor direction keys, are also included and coupled to the bus for communicating direction information and command selections to the processor and for controlling cursor movement on the display.

The computer system also typically includes a communication interface coupled to the bus which provides for two-way, wired and/or wireless data communication to/from the computer system, for example, via a local area network (LAN). The communication interface sends and receives electrical, electromagnetic or optical signals which carry digital data streams representing various types of information. For example, two or more computer systems may be networked together in a conventional manner with each using a respective communication interface.

The network link typically provides data communication through one or more networks to other data devices. For example, the network link may provide a connection through a LAN to a host computer or to data equipment operated by an Internet service provider (ISP). The ISP in turn provides data communication services through the Internet, which, in turn, may provide connectivity to multiple remote computer systems. The computer system can send messages and receive data through the network(s), network link and communication interface.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

Thus, methods and systems for grouping of users into overlapping clusters in social networks have been described. Although discussed with reference to certain examples, the present invention should not be limited thereby.

What is claimed is:

1. A method, comprising automatically clustering members of a social network user's social graph, in which graph individuals are represented as nodes and connections between individuals are represented as edges between the nodes, the social graph thereby being a defined set of relationships among the members, the clustering being performed using patterns of past communications among the members of the social graph as a basis for said clustering by partitioning said members of the social graph into respective, overlapping clusters according to a defined optimization function, with each respective cluster of the overlapping clusters representing a group of said members having a high degree of intra-cluster communication, said clustering performed (i) by a computer system according to a sorting in accordance with non-principal eigenvectors of connectivity matrices describing the intra-cluster communications, and (ii) according to the optimization function, which comprises a rule-based quality function which favors selection of clusters which have minimum similarity among their respective memberships, for which eigenvectors of the connectivity matrices exhibit maximum internal density and minimum external sparsity, and which imposes a penalty based on a size of a cluster.

2. The method of claim 1, wherein the connectivity matrices comprise an adjacency matrix and a Laplacian, the adjacency matrix having elements $$a_{i,j} = \begin{cases} 1, & (v_i, v_j) \in E \\ 0, & (v_i, v_j) \notin E \end{cases}$$

and the Laplacian having elements $$l_{i,j} = \begin{cases} a_{i,j}, & i \neq j \\ \sum_k a_{i,k}, & i = j \end{cases}$$

where vertices v represent the members of the user's social graph and E represents connections between said members.

* * * * *